US012179044B2

(12) United States Patent
Lin et al.

(10) Patent No.: US 12,179,044 B2
(45) Date of Patent: Dec. 31, 2024

(54) POSITIVE-PRESSURE PROTECTIVE WEAR

(71) Applicants: Yung Chi Lin, Taichung (TW); Chao-Ting Lin, Taichung (TW); Tzu-Ying Lin, Taichung (TW)

(72) Inventors: Yung Chi Lin, Taichung (TW); Chao-Ting Lin, Taichung (TW); Tzu-Ying Lin, Taichung (TW)

( * ) Notice: Subject to any disclaimer, the term of this patent is extended or adjusted under 35 U.S.C. 154(b) by 962 days.

(21) Appl. No.: 17/201,594

(22) Filed: Mar. 15, 2021

(65) Prior Publication Data

US 2021/0393995 A1 Dec. 23, 2021

(30) Foreign Application Priority Data

Jun. 17, 2020 (TW) ................................ 109207627

(51) Int. Cl.

| | |
|---|---|
| ***A62B 17/00*** | (2006.01) |
| ***A42B 3/28*** | (2006.01) |
| ***A62B 7/10*** | (2006.01) |
| ***A62B 7/12*** | (2006.01) |
| ***A62B 18/00*** | (2006.01) |
| ***A62B 18/04*** | (2006.01) |

(52) U.S. Cl.

CPC .............. *A62B 17/006* (2013.01); *A42B 3/28* (2013.01); *A62B 7/10* (2013.01); *A62B 7/12* (2013.01); *A62B 18/006* (2013.01); *A62B 18/04* (2013.01)

(58) Field of Classification Search

CPC ........... A62B 17/006; A62B 7/10; A62B 7/12; A62B 18/006; A62B 18/04; A62B 23/00–04; A62B 18/045; A62B 17/04; A42B 3/28; A61F 9/06; A61F 9/068; A41D 13/11–1192

See application file for complete search history.

(56) References Cited

U.S. PATENT DOCUMENTS 2,413,386 A * 12/1946 Schulz ............... A41D 13/0025 2/458
2,882,894 A * 4/1959 Fahey .................... A62B 17/04 2/8.1
3,174,300 A * 3/1965 Webb ..................... B64D 10/00 62/317
3,736,927 A * 6/1973 Misaqi ................. A62B 18/006 128/201.25

(Continued)

FOREIGN PATENT DOCUMENTS

CN 201949521 U * 8/2011
CN 203355159 U * 12/2013

(Continued)

OTHER PUBLICATIONS

English translation for CN 203355159, machine translated by Espacenet.com.*

(Continued)

*Primary Examiner* — Tu A Vo

(74) *Attorney, Agent, or Firm* — Best & Flanagan LLP

(57) ABSTRACT

A positive-pressure protective wear has a protective body and an air supply. The protective body has a clothing and a headgear connected with the clothing. The air supply is connected with the protective body and inputs gas into the protective body to keep the protective body under positive pressure, and this can provide an effect of ventilation.

7 Claims, 8 Drawing Sheets

(56) References Cited

U.S. PATENT DOCUMENTS 3,963,021 A * 6/1976 Bancroft .............. A62B 18/045 128/201.25
4,019,508 A * 4/1977 Der Estephanian ........................ A61M 16/1065 128/202.19
4,236,514 A * 12/1980 Moretti .................. A62B 17/04 2/205
4,430,995 A * 2/1984 Hilton ...................... A62B 7/10 128/205.12
4,458,680 A * 7/1984 Childers .............. A62B 17/006 2/457
4,484,575 A * 11/1984 Brockway .............. A62B 17/04 2/909
4,502,480 A * 3/1985 Yamamoto ............. A42B 3/288 128/201.15
4,590,951 A * 5/1986 O'Connor ............ A62B 18/006 128/205.12
4,815,458 A * 3/1989 Sing ......................... A62B 7/00 128/205.12
4,864,654 A * 9/1989 Schriver .............. A62B 17/001 2/84
5,088,115 A * 2/1992 Napolitano ........ A41D 13/0025 2/84
5,394,870 A * 3/1995 Johansson ............ A62B 18/006 128/201.25
5,592,936 A * 1/1997 Thomas, Jr. ........... A41D 13/11 128/201.24
5,655,374 A * 8/1997 Santilli .............. A41D 13/1218 2/905
5,991,921 A * 11/1999 Saito ...................... A42B 1/046 2/84
6,701,920 B1 * 3/2004 Cox ....................... A62B 17/04 2/6.2
6,854,459 B1 * 2/2005 Cox ....................... A62B 17/04 2/205
9,931,482 B2 * 4/2018 Ritchie .................. A62B 17/04
10,086,220 B2 * 10/2018 Dolan .................. A62B 18/084
10,799,727 B2 * 10/2020 Giulianotti ............. A62B 18/04
11,027,156 B2 * 6/2021 Chessari ................ A62B 17/04
2003/0188368 A1 * 10/2003 Stinton .............. A41D 13/0005 2/2.16
2003/0192103 A1 * 10/2003 Avery .................. A62B 17/006 2/69
2003/0192537 A1 * 10/2003 Odell ................... A62B 17/006 128/201.25
2003/0192541 A1 * 10/2003 Avery .................. A62B 17/006 128/201.22
2004/0168459 A1 * 9/2004 Blackstone .......... B60H 1/3235 2/DIG. 1
2005/0178138 A1 * 8/2005 Blackstone ........ A41D 13/0025 62/425
2006/0041994 A1 * 3/2006 Germain .............. A41D 13/002 2/457
2006/0118116 A1 * 6/2006 Porat ...................... A62B 17/04 128/205.27
2006/0213523 A1 * 9/2006 VanDerWoude ... A41D 13/0025 128/863
2007/0028372 A1 * 2/2007 VanDerWoude ......... A42B 3/30 2/457
2007/0240719 A1 * 10/2007 Duarte ................. A62B 18/006 128/205.27
2007/0283961 A1 * 12/2007 Hsieh ................... A62B 17/006 128/205.27
2008/0196723 A1 * 8/2008 Tilley .................. A61M 16/204 128/204.23
2009/0100560 A1 * 4/2009 Anderson ............. A42B 1/048 2/457
2009/0151054 A1 * 6/2009 VanDerWoude ....... A42B 3/286 2/410
2009/0260137 A1 * 10/2009 Koch ................... A62B 17/005 165/46
2010/0037891 A1 * 2/2010 Walker ..................... A62B 7/12 128/201.23
2010/0108067 A1 * 5/2010 Walker ................. A62B 18/006 128/205.24
2010/0224194 A1 * 9/2010 Walker ................... A62B 18/02 128/205.24
2010/0263671 A1 * 10/2010 Walker ................... A62B 17/04 128/205.25
2010/0294270 A1 * 11/2010 Curran ................. A62B 18/045 128/201.23
2011/0265790 A1 * 11/2011 Walker ................... A42B 3/286 128/201.23
2012/0051904 A1 * 3/2012 Hagen .................... B62K 11/02 415/224
2012/0174296 A1 * 7/2012 Martin ................. A62B 17/006 2/457
2012/0246809 A1 * 10/2012 Elam ...................... A42B 3/227 2/424
2013/0092164 A1 * 4/2013 Curran ................... A62B 23/02 128/204.21
2013/0097769 A1 * 4/2013 Tuffery ................ A62B 17/006 2/456
2013/0186279 A1 * 7/2013 Dwyer ................. A62B 18/088 96/418
2013/0319408 A1 * 12/2013 Zwolinsky ............. A62B 18/02 128/204.21
2015/0114389 A1 * 4/2015 Sernfalt ................. A62B 9/006 128/202.22
2015/0211534 A1 * 7/2015 Volmer ................ A62B 18/006 417/45
2016/0090989 A1 * 3/2016 Volmer ................... F04D 29/62 415/118
2017/0189727 A1 * 7/2017 Hunter ................. A62B 18/006
2018/0028846 A1 * 2/2018 Hur ........................ A62B 17/04
2018/0084848 A1 * 3/2018 Pavalarajan .......... H03M 5/145
2019/0143154 A1 * 5/2019 Gangadhar .......... A62B 18/006 128/202.22
2019/0289946 A1 * 9/2019 Perusse ................ A62B 18/003
2019/0357625 A1 * 11/2019 Chen ........................ A42B 3/16
2020/0060359 A1 * 2/2020 Jascomb ............ A41D 13/1218
2020/0060375 A1 * 2/2020 Jascomb ................ A62B 17/04
2020/0316412 A1 * 10/2020 Weber .................. A62B 17/006
2021/0113860 A1 * 4/2021 Hamill ................... A42B 3/286

FOREIGN PATENT DOCUMENTS

TW M454737 U 6/2013
TW M457575 U 7/2013
TW M604134 U 11/2020

OTHER PUBLICATIONS

English translation for CN 201949521, machine translated by Search Clarivate Analytics.*

* cited by examiner

POSITIVE-PRESSURE PROTECTIVE WEAR

BACKGROUND OF THE INVENTION

1. Field of the Invention

The present invention relates to a protective wear, and more particularly to a positive-pressure protective wear which keeps an interior thereof under positive pressure over exterior air pressure to avoid invasion of exterior air.

2. Description of Related Art

For agricultural workers, pesticides are widely applied on their crops in order to keep pests and diseases away. A plenty of farmworkers apply pesticides on their own, which means they carry a pesticide barrel and arrive at a center of a farm field to spray the pesticides onto the crops. In this way, the farmworkers would be in contact with the pesticide vapor spread in the air. The harmful pesticide vapor may either fall on the farmworkers' skin or be breathed in by the farmworkers, thereby causing health risks.

A conventional protective wear is provided to solve the above-mentioned problem. When a farmworker puts on the conventional protective wear, the farmworker himself is covered by the conventional protective wear and isolated from the exterior air, so contact with the pesticide vapor may be avoided.

However, the conventional protective wear is made of impermeable material, so after working for a couple of hours in the conventional protective wear, the farmworker will feel sultry and uncomfortable as humidity accumulates in the conventional protective wear.

SUMMARY OF THE INVENTION

The main objective of the present invention is to provide positive-pressure protective wear with a ventilatory effect, so as to solve the problem of sultry and uncomfortable feel after a long-time wearing of the conventional protective wear.

An embodiment of the positive-pressure protective wear has a protective body and an air supply. The protective body has a clothing and a headgear connected with the clothing. The air supply is connected with the protective body and inputs gas into the protective body to keep the protective body under positive pressure.

Another embodiment of the positive-pressure protective wear has a headgear, an auxiliary component, and an air supply. The headgear is for wrapping a wearer's head and has a front cover and a rear cover. The rear cover is detachably mounted with the front cover and wraps the wearer's head together with the front cover when the rear cover is mounted with the front cover. The auxiliary component is connected with the headgear, and is configured to be securely mounted on the wearer's body to prevent the headgear falling off from the wearer's head. The air supply is connected with the headgear and inputs gas into the headgear to keep the headgear under positive pressure.

Other objectives, advantages and novel features of the present invention will become more apparent from the following detailed description when taken in conjunction with the accompanying drawings.

DETAILED DESCRIPTION OF THE PREFERRED EMBODIMENT

Figure 1:
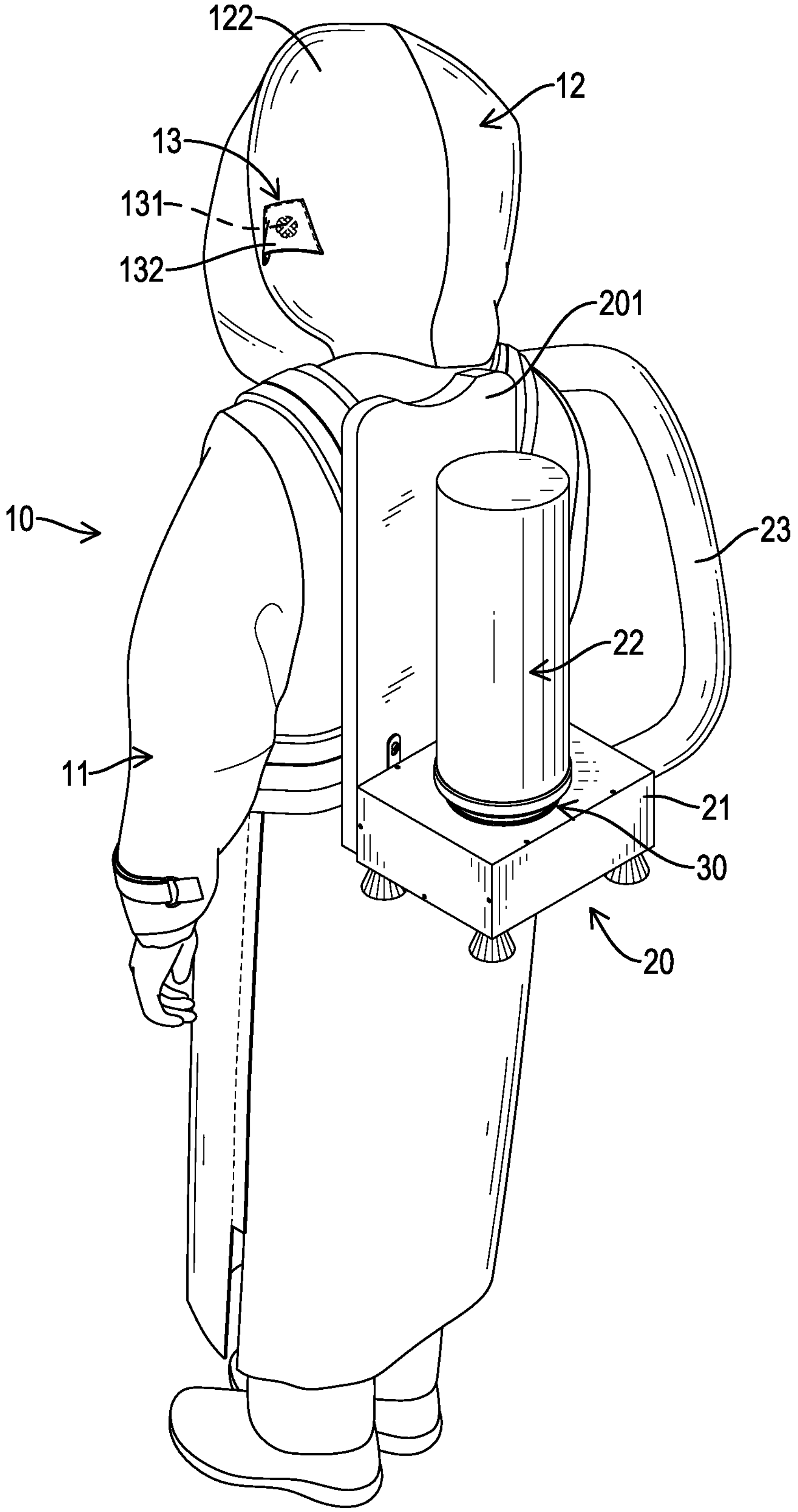
FIG. 1 is a rear perspective view of a first preferred embodiment of a positive-pressure protective wear in accordance with the present invention.

With reference to FIG. 1, a first preferred embodiment of a positive-pressure protective wear in accordance with the present invention comprises a protective body 10 and an air supply 20. The protective body 10 has a clothing 11, a headgear 12 connected with the clothing 11, and at least one pressure relief set 13.

The clothing 11 may have a zipper, a hook-and-loop fastener, or the like on a side of the clothing 11, so a wearer may put on or take off the clothing 11 easily. The headgear 12 is connected with a top of the clothing 11 and is formed in the configuration of a bag for the wearer to extend his head into the headgear 12. An interior space of the clothing 11 and that of the headgear 12 fluidly communicate with each other. Furthermore, with reference to FIGS. 1 and 2, the headgear 12 has a transparent front side 121 and a non-transparent rear side 122 connected to the transparent front side 121.

The at least one pressure relief set 13 includes a pressure relief hole 131 and a shielding piece 132. The pressure relief hole 131 is disposed through the clothing 11 or the headgear 12 of the protective body 10, and in the first preferred embodiment of the present invention, the pressure relief hole 131 is disposed through the headgear 12. However, in other embodiments, the pressure relief hole 131 may be disposed on the clothing 11, e.g. on a sleeve of the clothing 11. The shielding piece 132 is connected to the clothing 11 or the headgear 12 of the protective body 10, and covers the pressure relief hole 131. The shielding piece 132 is connected to the clothing 11 or the headgear 12 at a location near the pressure relief hole 131.

When pressure inside the protective body 10 goes too high, gas/air may escape from the pressure relief hole 131 of the at least one pressure relief set 13, so the pressure inside the protective body 10 may be rebalanced.

Figure 2:
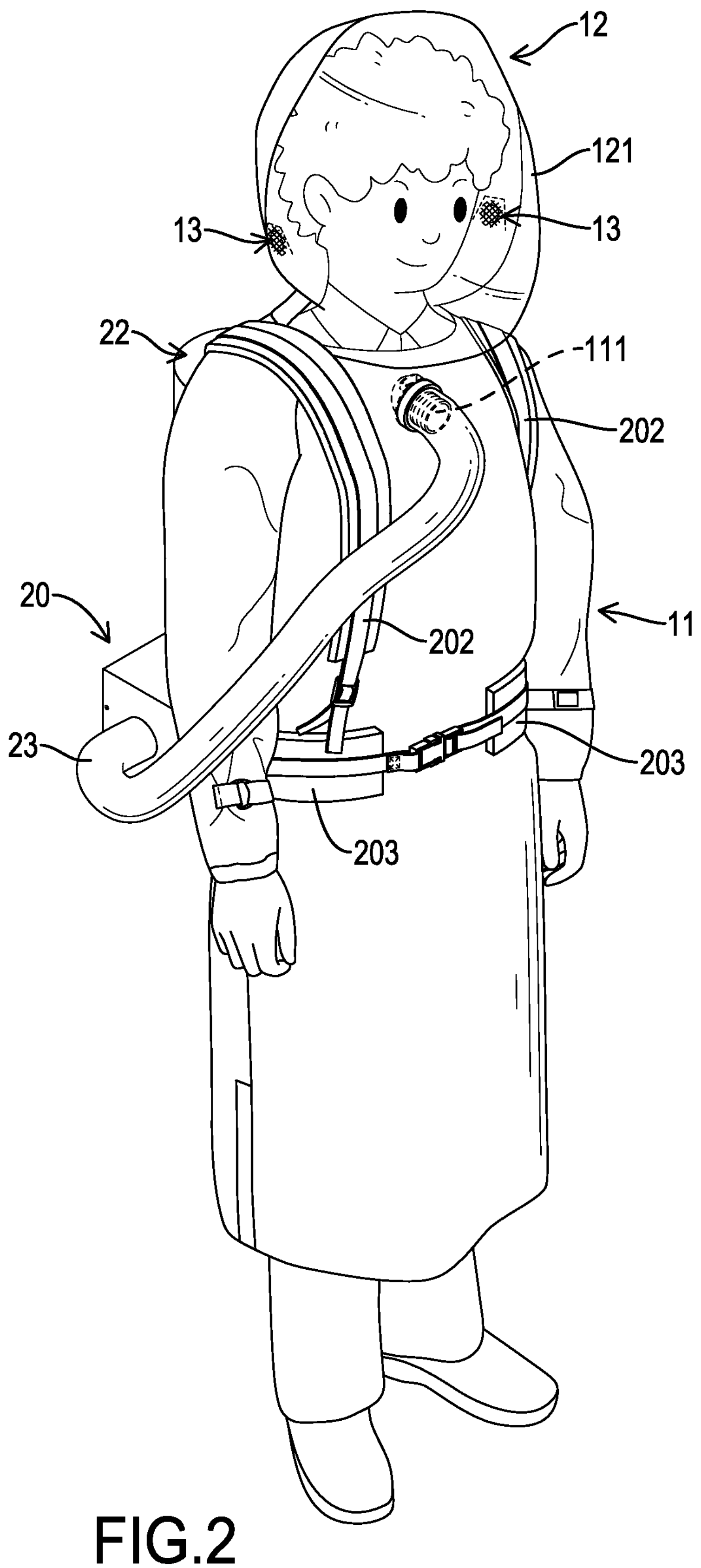
FIG. 2 is a front perspective view of the positive-pressure protective wear in FIG. 1.

With reference to FIGS. 1 and 2, the air supply 20 is connected with the protective body 10, inputs gas into the protective body 10 to keep the protective body 10 under positive pressure. That is, pressure inside the protective body 10 is always larger than pressure outside the protective body 10, i.e. the atmospheric pressure. Further, the air supply 20 comprises a supporting component 201, a ventilator 21, a connecting assembly 30, a filtering assembly 22, and a tube 23. The supporting component 201 may be a rack, a base, a board, etc. for mounting the rest of the components of the air supply 20. In the first preferred embodiment of the present invention, the supporting component 201 is a backboard with two straps 202, so the wearer may carry the air supply 20 on his back. Further, each one of the two straps 202 is connected with a belt 203, and the two belts 203 are detachably buckled. In this way, the air supply 20 is portable in the first preferred embodiment.

The ventilator 21 is fixed on a rear side near a bottom of the backboard, and is used for drawing gas. The connecting assembly 30 is mounted on the ventilator 21. The filtering assembly 22 is assembled onto the connecting assembly 30, and communicates with the ventilator 21 so air can pass therebetween. The tube 23 is connected with the ventilator 21 and the clothing 11 or the headgear 12 of the protective body 10.

In the first preferred embodiment of the present invention, with reference to FIG. 2, the clothing 11 of the protective body 10 has a fastener 111, and an end of the tube 23 that is away from the ventilator 21 is detachably connected with the fastener 111. So when the ventilator 21 is switched on, air is drawn through the filtering assembly 22, the connecting assembly 30, and the ventilator 21, is pumped into the tube 23, enters the clothing 11 of the protective body 10, and eventually escapes from the pressure relief hole 131 of the at least one pressure relief set 13 on the headgear 12. In this way, exterior air with pesticide vapor can be filtered by the filtering assembly 22 before being supplied for breathing. Besides, the shielding piece 132 of the at least one pressure relief set 13 prevents the protective body 10 from being invaded by the harmful air through the pressure relief hole 131.

Figure 3:
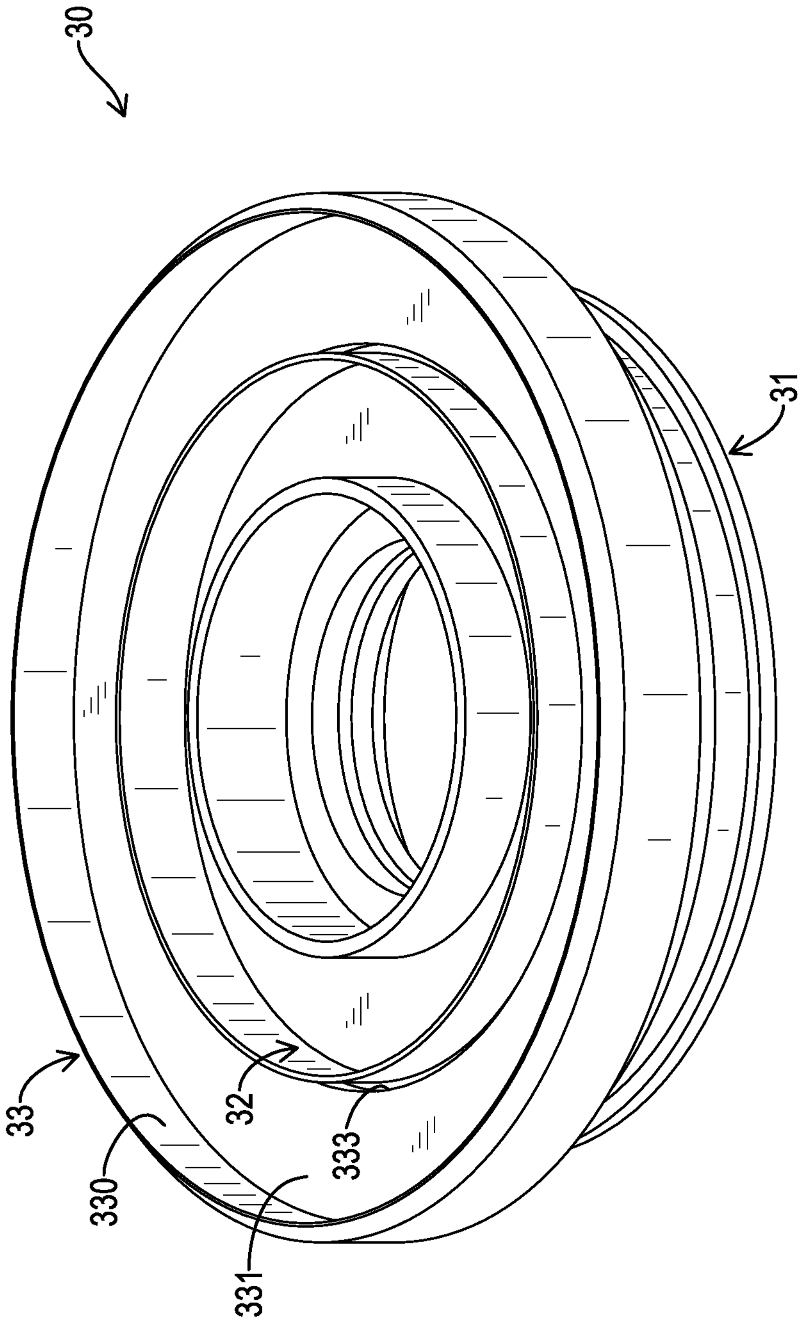
FIG. 3 is a perspective view of a connecting assembly of the positive-pressure protective wear in FIG. 1.
Figure 4:
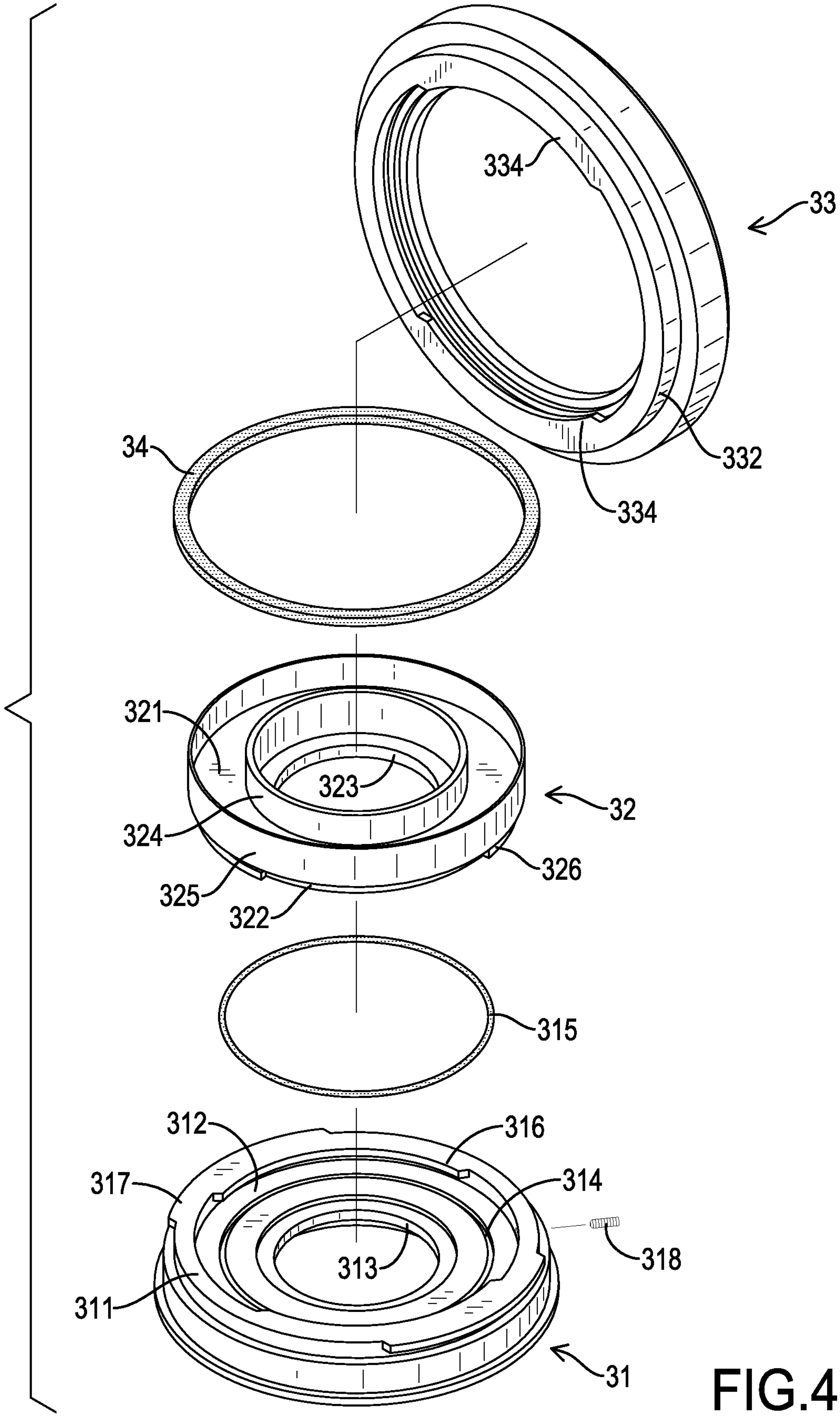
FIG. 4 is an exploded view of the connecting assembly in FIG. 3.
Figure 5:
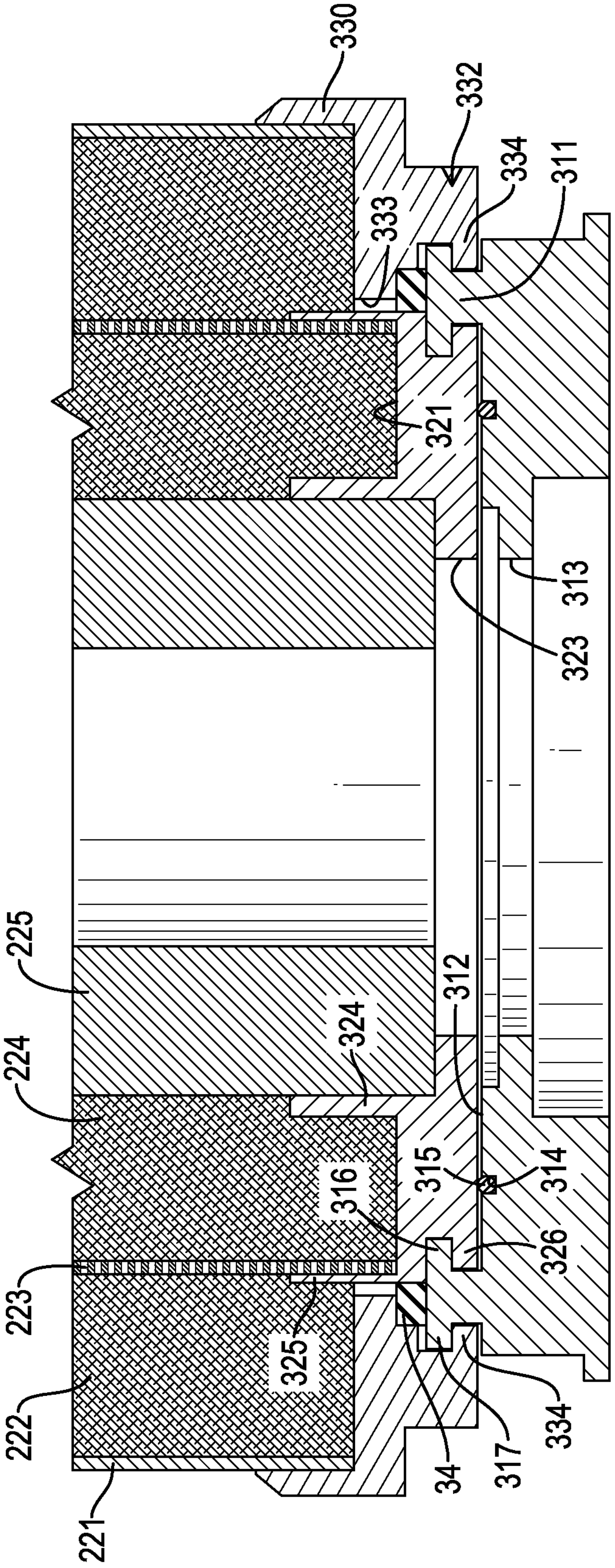
FIG. 5 is an enlarged cross sectional side view of the connecting assembly and a filtering assembly of the positive-pressure protective wear in FIG. 1.

With reference to FIGS. 3 to 5, the connecting assembly 30 is connected with the air supply 20 and comprises an assembly base 31 and a filter seat. The assembly base 31 is mounted on the ventilator 21, and the filter seat is mounted with the assembly base 31 for assembling the filtering assembly 22. In the first preferred embodiment of the present invention, the filter seat includes an interior component 32 and an exterior component 33. The interior component 32 and the exterior component 33 are respectively engaged with the assembly base 31. In other embodiments, only one, instead of both, of the interior component 32 and the exterior component 33 of the filter seat may be used.

The assembly base 31 has a center, two sides opposed to each other, a connecting portion 311, an installation groove 312, a ventilation opening 313, a sealing groove 314, and a sealing ring 315. One of the two sides of the assembly base 31 is mounted with the ventilator 21. The connecting portion 311 protrudes from the other one of the two sides of the assembly base 31, is formed in the shape of a ring, and thereby has an inner side. The installation groove 312 is formed on the inner side of the connecting portion 311. The ventilation opening 313 is disposed through the center of the assembly base 31, and communicates with the installation groove 312.

The sealing groove 314 is axially disposed on a bottom of the installation groove 312 and surrounds the ventilation opening 313. The sealing ring 315 is received in the sealing groove 314, and may be an O-ring.

Furthermore, the connecting portion 311 comprises at least one inward protrusion 316 and at least one outward protrusion 317. The at least one inward protrusion 316 radially and inwardly protrudes from a top of the connecting portion 311 and extends toward a center of the connecting portion 311. The at least one outward protrusion 317 radially and outwardly protrudes from the top of the connecting portion 311.

The interior component 32 is mounted with the assembly base 31 and has two surfaces opposed to each other, an interior containing groove 321, an interior engaging portion 322, and an interior through hole 323. The interior component 32 has two circular sidewalls 324, 325 protruding upwardly from one of the two surfaces of the interior component 32 instead of protruding toward the assembly base 31 at a radial spaced interval, and the interior containing groove 321 is formed between the two circular sidewalls 324, 325. The interior engaging portion 322 is formed on the other one of the two surfaces of the interior component 32. The interior engaging portion 322 extends into the installation groove 312 of the assembly base 31, and is engaged with the connecting portion 311 of the assembly base 31. The interior engaging portion 322 has at least one interior engaging protrusion 326 for engaging the at least one inward protrusion 316 of the connecting portion 311. The interior through hole 323 is disposed through a center of the interior component 32, is coaxial to the two circular sidewalls 324, 325, and communicates with the ventilation opening 313 of the assembly base 31. In the first preferred embodiment of the present invention, the connecting portion 311 has two said inward protrusions 316, and the interior engaging portion 322 has two said interior engaging protrusions 326 corresponding to the two inward protrusions 316. Moreover, when the interior component 32 is mounted with the assembly base 31, the interior component 32 abuts the sealing ring 315, so the sealing ring 315 can hamper radial fluid communication and avoid gas leak.

With reference to FIGS. 4 and 5, the interior component 32 has a central containing groove formed inside an inner one of said circular side walls 324. The central containing groove is surrounded by the interior containing groove 321, and the interior through hole 323 communicates with an interior of the central containing groove.

The exterior component 33 is mounted with the assembly base 31, surrounds the interior component 32, and has two surfaces opposed to each other, a flange 330, an exterior containing groove 331, an exterior engaging portion 332, and a through hole 333. The flange 330 extends from an edge of the exterior engaging portion 33, and protrudes upwardly from one of the two surfaces of the exterior component 33 instead of protruding toward the interior component 32 or the assembly base 31. The exterior containing groove 331 is formed inside the flange 330 on the same surface of the exterior component 33. The exterior engaging portion 332 is formed on the other one of the two surfaces of the exterior component 33, and is engaged with the connecting portion 311 of the assembly base 31. The exterior engaging portion 332 has at least one exterior engaging protrusion 334 for engaging the at least one outward protrusion 317 of the connecting portion 311. The through hole 333 is disposed through the exterior component 33, is coaxial to the flange 330, and communicates with the ventilation opening 313 of the assembly base 31 (indirectly when the interior component 32 is mounted with the assembly base 31). Moreover, the through hole 333 is large enough so that the interior component 32 is configured to pass through the through hole 333. In the first preferred embodiment of the present invention, the connecting portion 311 has two said outward protrusions 317, and the exterior engaging portion 332 has two said exterior engaging protrusions 334 corresponding to the two said outward protrusions 317.

Furthermore, the exterior component 33 is mounted with the assembly base 31 via the two exterior engaging protrusions 334 of the exterior component 33 and the two outward protrusions 317 of the assembly base 31. The interior component 32 is mounted with the assembly base 31 via the two interior engaging protrusions 326 of the interior component 32 and the two inward protrusions 316 of the assembly base 31. The connecting assembly 30 may further comprise a sealing component 34. The sealing component 34 is located between the interior component 32 and the exterior component 33 and abuts the two components 32, 33, so air cannot pass through a subtle gap formed between the assembly base 31 and the exterior component 33.

In other embodiments, the interior component 32 and the exterior component 33 may be respectively mounted with the assembly base 31 by threading.

In addition, with reference to FIG. 4, the assembly base 31 may have a set screw 318 disposed through the connecting portion 311. Each one of the interior component 32 and the exterior component 33 has a blocking part (not shown in the drawings) to abut the set screw 318 so as to avoid inadvertent rotation between the interior component 32 and the assembly base 31.

With reference to FIG. 5, the filtering assembly 22 comprises multiple supporting frames and multiple filter layers. In the first preferred embodiment of the present invention, the filtering assembly 22 comprises a first supporting frame 221, a first filter layer 222, a second supporting frame 223, a second filter layer 224, and a third filter layer 225 arranged in order, and each having a cylindrical structure. The first supporting frame 221 is inserted into the exterior containing groove 331 and radially abuts the flange 330. The second supporting frame 223 is inserted into the interior containing groove 321 and radially abuts an outer one of the two circular sidewalls 325 of the interior component 32. The first filter layer 222 is received between the first supporting frame 221 and the second supporting frame 223. The second filter layer 224 is received between the second supporting frame 223 and an inner one of the two circular sidewalls 324 of the interior component 32. The third filter layer 225 is contained in the central containing groove of the interior component 32 and received inside the second filter layer 224. In the first preferred embodiment of the present invention, the first and the second filter layers 222, 224 are made of activated carbon, and the third filter layer 225 is made of melt-blown nonwovens.

Figure 6:
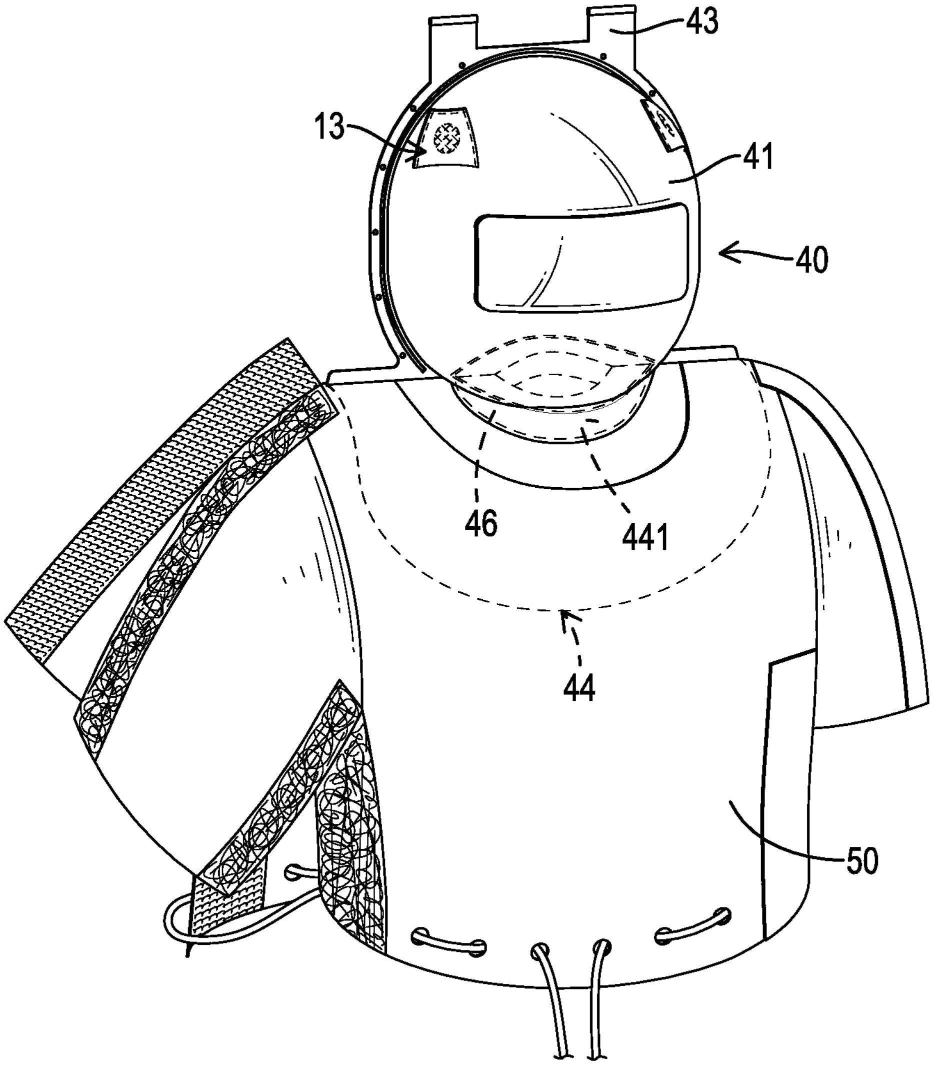
FIG. 6 is a perspective view of a second preferred embodiment of a positive-pressure protective wear in accordance with the present invention.
Figure 7:
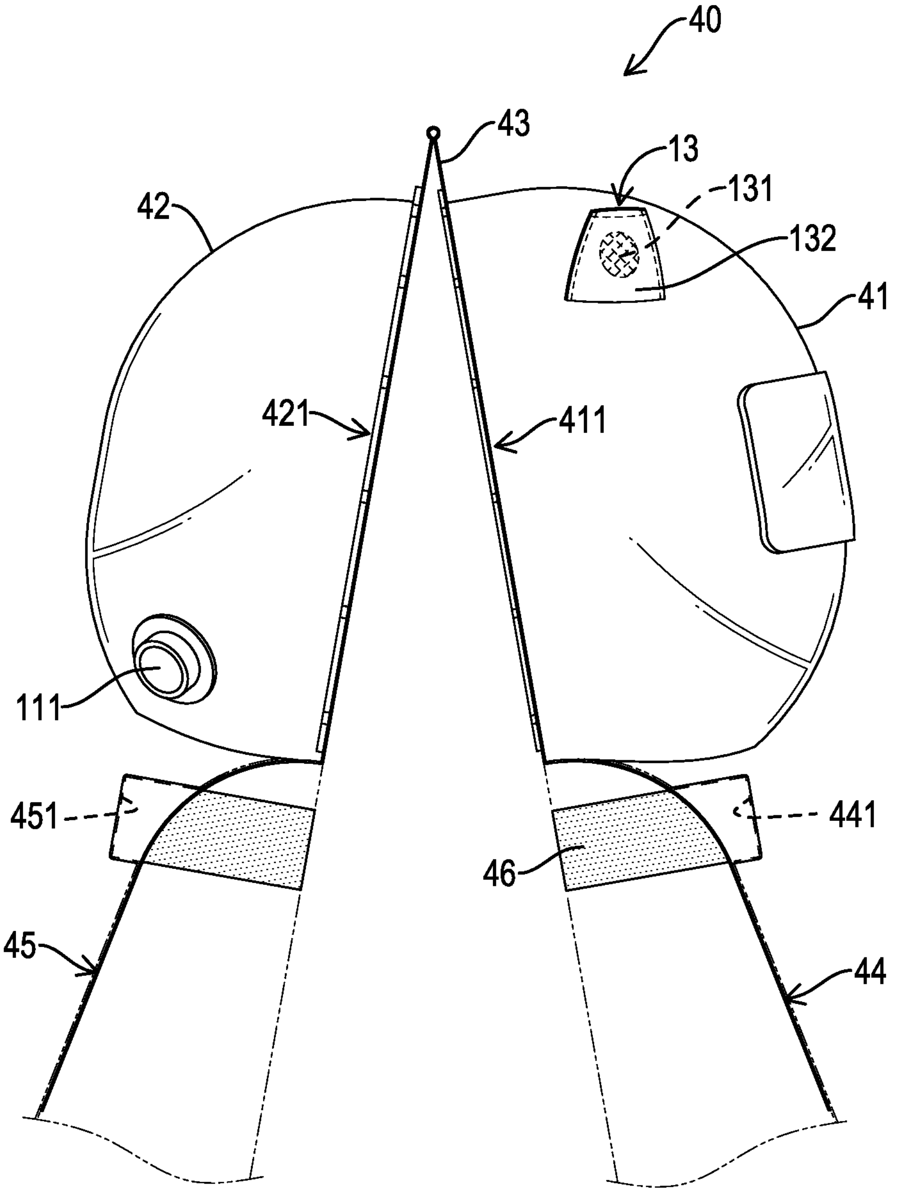
FIG. 7 is an operational side view of a headgear of the positive-pressure protective wear in FIG. 6.
Figure 8:
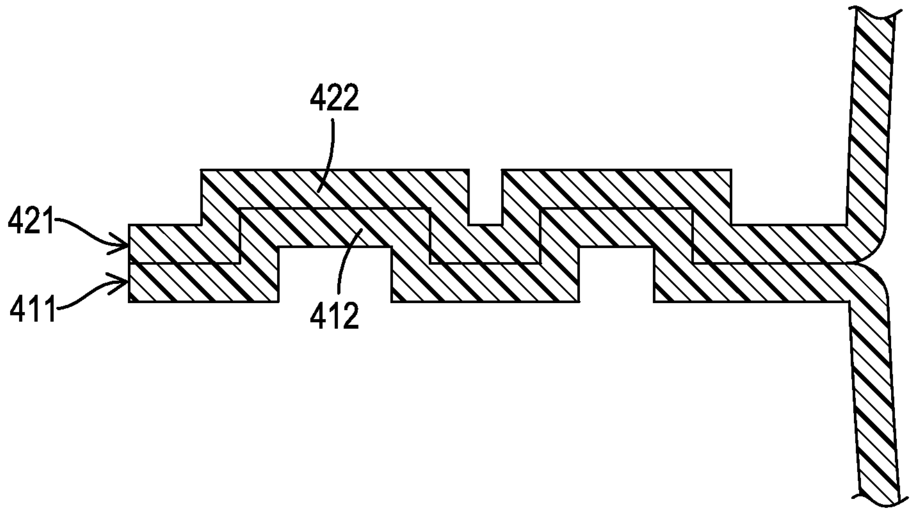
FIG. 8 is an enlarged cross sectional side view of the headgear in FIG. 6.

A second preferred embodiment of the present invention is shown in FIGS. 6 to 8. The positive-pressure protective wear of the second preferred embodiment has a headgear 40 and an auxiliary component 50. Besides, the air supply 20 of the first preferred embodiment of the present invention is also included to keep the headgear under positive pressure though not shown in FIGS. 6 to 8.

With reference to FIGS. 6 and 7, the headgear 40 is for wrapping a wearer's head and has a front cover 41, a rear cover 42, and a pivoting portion 43. The rear cover 42 is detachably mounted with the front cover 41, and wraps the wearer's head together with the front cover 41 when the rear cover 42 is mounted with the front cover 41. The pivoting portion 43 is connected with the front cover 41 and the rear cover 42 so the two covers 41, 42 are able to swing with respect to each other. The front cover 41 has a first mounting flange 411 protruding from an edge of the front cover 41. The rear cover 42 has a second mounting flange 421 protruding from an edge of the rear cover 42 and detachably mounted with the first mounting flange 411. With reference to FIG. 8, the first mounting flange 411 has multiple protrusions 412, the second mounting flange 421 has multiple recesses 422, and each one of the multiple protrusions 412 is detachably inserted into a respective one of the multiple recesses 422. Moreover, a sealing strip may be mounted on each one of the two mounting flanges 411, 421 between the wearer's head and the multiple protrusions 412 and the multiple recesses 422. Also, the multiple protrusions 412 and the multiple recesses 422 may be substituted with buttons.

In addition, the headgear 40 of the second preferred embodiment has said pressure relief sets 13 and said fastener 111 of the positive-pressure protective wear of the first preferred embodiment. The pressure relief sets 13 are disposed on the front cover 41 at a spaced interval, and the fastener 111 is disposed on the rear cover 42. Therefore, filtered air may enter the headgear 40 at the rear cover 42 and leave the headgear 40 at the front cover 41 via the pressure relief sets 13. However, positions of the pressure relief sets 13 and the fastener 111 may be changed if necessary.

The headgear 40 further comprises two extending sheets 44, 45 and two sealing elements 46. The two extending sheets 44, 45 are respectively connected with the front cover 41 and the rear cover 42, and each one of the two extending sheets 44, 45 has a receiving groove 441, 451. Each one of the two sealing elements 46 is disposed in the receiving groove 441, 451 of a respective one of the two extending sheets 44, 45, and the two sealing elements 46 jointly surround the wearer's neck airtightly, so as to isolate space in the headgear 40. The two sealing elements 46 may be foaming or elastic material, such as a sponge.

The auxiliary component 50 is connected with the headgear 40 and is configured to be securely mounted on the wearer's body to prevent the headgear 40 from falling off from the wearer's head. In the second preferred embodiment, the auxiliary component 50 is a half-plate structure that presses on the two extending sheets 44, 45 of the headgear 40. Through hook-and-loop fasteners, buttons, or the like, the auxiliary component 50 may be connected with the extending sheets 44, 45 of the headgear 40. Furthermore, parts of the half-plate structure are located under the wearer's armpits, so the auxiliary component 50 can provide a positioning effect on the headgear 40. In other words, when the headgear 40 is about to be taken off from the wearer, the auxiliary component 50 will be raised by the two extending sheets 44, 45. However, the auxiliary component 50 will be eventually stuck by the wearer's arms, so the headgear 40 cannot fall off. Other body parts of the wearer may provide the sticking effect, and thereby can be used for wearing the auxiliary component 50. In the second preferred embodiment, the auxiliary component 50 is composed of two pieces of cloth, and the two pieces of cloth can be mounted by hook-and-loop fasteners, binding, or zippers.

With the aforementioned technical characteristics, the positive-pressure protective wear of the present invention has the following advantages. The air supply 20 can consistently provide fresh and clean air into the headgear 12, 40 and/or the clothing 11, and thereby keeps the protective body 10 (or the headgear 40) under positive pressure so as to ventilate and reject the harmful air with pesticide vapor. To sum up, the present invention ensures the wearer's health and provides a comfortable working environment for the farmworkers. Furthermore, the positive-pressure protective wear is light in heaviness and easy to be worn. Besides farming use, the positive-pressure protective wear may be provided for medical use or be used in an environment suffering heavy sand and dust, or air pollution, so as to protect the wearer from respiratory problems.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A positive-pressure protective wear comprising:

a protective body having a clothing and a headgear connected with the clothing, wherein the protective body has two receiving grooves and two sealing elements, each one of the two sealing elements disposed in a respective one of the two receiving grooves, and the two sealing elements configured to jointly surround a wearer's neck airtightly so as to isolate space in the headgear; and a portable air supply connected with the protective body and inputting gas into the protective body to keep the protective body under positive pressure, wherein the portable air supply comprises:

a ventilator used for drawing gas;

a filtering assembly capable of receiving gas from the ventilator, the filtering assembly having multiple filter layers;

a connecting assembly mounted on the ventilator and the filtering assembly such that gas is configured to pass between the ventilator and the filtering assembly, wherein the connecting assembly comprises:

a sealing component that is ring-shaped;

an assembly base mounted on the ventilator, the assembly base having a first side and a second side opposite the first side, wherein the first side of the assembly base is mounted on the ventilator; the assembly base comprising:

a ring-shaped connecting portion protruding on the second side, the ring-shaped connecting portion having an inner side;

a first installation groove formed on the inner side of the ring-shaped connecting portion, the first installation groove is delimited by an inward protrusion of the ring-shaped connecting portion, a second installation groove formed on an exterior side of the ring-shaped connecting portion, the second installation groove is being delimited by an outward protrusion of the ring-shaped connecting portion, a surface of the ring-shaped connecting portion extends from the outward protrusion to the inward protrusion; and a ventilation opening formed through the assembly base and communicating with the first installation groove; and a filter seat mounted with the ring-shaped connecting portion of the assembly base, wherein the filter seat has an interior component mounted with the assembly base and an exterior component mounted with the assembly base, the interior component is ring-shaped and the exterior component is ring-shaped, the exterior component is configured to surround the interior component, the interior component having a first surface and a second surface opposite the first surface, wherein the interior component comprises:

an interior containing groove disposed on the first surface of the interior component, an interior engaging portion disposed on the second surface of the interior component, wherein the interior engaging portion extends into the first installation groove and is engaged with the ring-shaped connecting portion;

the interior engaging portion comprising an interior engaging groove and an interior engaging protrusion formed by the second surface;

a central containing groove disposed on the first surface of the interior component, the central containing groove surrounded by the interior containing groove; and an interior through hole disposed through the interior component and communicating with the ventilation opening and an interior of the central containing groove, wherein the exterior component comprises an interior surface, the interior surface of the exterior component forming an interior groove and an exterior engaging protrusion, the interior groove of the interior surface of the exterior component is configured to receive the outward protrusion while the second installation groove is configured to receive the exterior engaging protrusion, and the first installation groove is configured to receive the interior engaging protrusion of the interior component while the interior engaging groove is configured to receive the inward protrusion of the ring-shaped connecting portion, and wherein the sealing component is configured to contact the surface of the ring-shaped connecting portion, the sealing component is configured to contact the interior component and contact the exterior component and the sealing component is positioned between the exterior component and the interior component; and a tube connected with the ventilator and connected with one of the clothing and the headgear of the protective body such that gas is drawn through the filtering assembly, the connecting assembly, and the ventilator, and is pumped into the protective body.

2. The positive-pressure protective wear as claimed in claim 1, wherein the assembly base has a sealing groove axially disposed on a bottom of the installation groove and surrounding the ventilation opening; and a sealing ring received in the sealing groove.

3. The positive-pressure protective wear as claimed in claim 1, wherein the protective body has at least one pressure relief set including a pressure relief hole disposed through the clothing or the headgear of the protective body; and a shielding piece connected to the clothing or the headgear of the protective body and covering the pressure relief hole.

4. A positive-pressure protective wear comprising:

a headgear for wrapping a wearer's head, the headgear comprising:

a front cover;

a rear cover detachably mounted with the front cover and wrapping the wearer's head together with the front cover when the rear cover is mounted with the front cover;

two extending sheets respectively connected with the front cover and the rear cover, each one of the two extending sheets having a receiving groove; and two sealing elements, each one of the two sealing elements disposed in the receiving groove of a respective one of the two extending sheets, and the two sealing elements configured to jointly surround the wearer's neck airtightly so as to isolate space in the headgear;

an auxiliary component connected with the headgear, the auxiliary component being a half-plate structure, having a portion configured to be located under a wearer's armpit, and configured to be securely mounted on the wearer's body to prevent the headgear falling off from the wearer's head, wherein the auxiliary component presses on the two extending sheets; and a portable air supply connected with the headgear and inputting gas into the headgear to keep the headgear under positive pressure; the portable air supply comprising:

a ventilator used for drawing gas;

a filtering assembly capable of receiving gas from the ventilator, the filtering assembly having multiple filter layers;

a connecting assembly mounted on the ventilator and the filtering assembly such that gas is configured to pass between the ventilator and the filtering assembly, wherein the connecting assembly comprises:

a sealing component that is ring-shaped;

an assembly base mounted on the ventilator, the assembly base having a first side and a second side opposite the first side, wherein the first side of the assembly base is mounted on the ventilator; the assembly base comprising:

a ring-shaped connecting portion protruding on the second side, the ring-shaped connecting portion having an inner side; an installation groove formed on the inner side of the ring-shaped connecting portion, the first installation groove is delimited by an inward protrusion of the ring-shaped connecting portion, a second installation groove formed on an exterior side of the ring-shaped connecting portion, the second installation groove is being delimited by an outward protrusion of the ring-shaped connecting portion, a surface of the ring-shaped connecting portion extends from the outward protrusion to the inward protrusion; and a ventilation opening formed through the assembly base and communicating with the first installation groove; and a filter seat mounted with the ring-shaped connecting portion of the assembly base, wherein the filter seat has an interior component mounted with the assembly base and an exterior component mounted with the assembly base, the interior component is ring-shaped and the exterior component is ring-shaped, the exterior component is configured to surround the interior component, the interior component having a first surface and a second surface opposite the first surface, wherein the interior component comprises:

an interior containing groove disposed on the first surface of the interior component, an interior engaging portion disposed on the second surface of the interior component, wherein the interior engaging portion extends into the first installation groove and is engaged with the ring-shaped connecting portion;

the interior engaging portion comprising an interior engaging groove and an interior engaging protrusion formed by the second surface;

a central containing groove disposed on the first surface of the interior component, the central containing groove surrounded by the interior containing groove; and an interior through hole disposed through the interior component and communicating with the ventilation opening and an interior of the central containing groove, wherein the exterior component comprises an interior surface, the interior surface of the exterior component forming an interior groove and an exterior engaging protrusion, the interior groove of the interior surface of the exterior component is configured to receive the outward protrusion while the second installation groove is configured to receive the exterior engaging protrusion, and the first installation groove is configured to receive the interior engaging protrusion of the interior component while the interior engaging groove is configured to receive the inward protrusion of the ring-shaped connecting portion, and wherein the sealing component is configured to contact the surface of the ring-shaped connecting portion, the sealing component is configured to contact the interior component and contact the exterior component and the sealing component is positioned between the exterior component and the interior component; and a tube connected with the ventilator and the headgear such that gas is drawn through the filtering assembly, the connecting assembly, and the ventilator, and is pumped into the headgear.

5. The positive-pressure protective wear as claimed in claim 4, wherein the assembly base has a sealing groove axially disposed on a bottom of the installation groove and surrounding the ventilation opening; and a sealing ring received in the sealing groove.

6. The positive-pressure protective wear as claimed in claim 4, wherein the front cover has a first mounting flange protruding from an edge of the front cover; and the rear cover has a second mounting flange protruding from an edge of the rear cover and detachably mounted with the first mounting flange.

7. The positive-pressure protective wear as claimed in claim 4, wherein the positive-pressure protective wear has at least one pressure relief set including a pressure relief hole disposed through the headgear; and a shielding piece connected to the headgear and covering the pressure relief hole.

* * * * *